US012779612B2

(12) United States Patent
Ishiyama et al.

(10) Patent No.: US 12,779,612 B2
(45) Date of Patent: Nov. 3, 2026

(54) CUTTING TOOL INSPECTION APPARATUS AND METHOD

(71) Applicant: AZBIL CORPORATION, Tokyo (JP)

(72) Inventors: Hiroshi Ishiyama, Tokyo (JP); Kenichi Yamagata, Tokyo (JP); Yoshinori Monaka, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 509 days.

(21) Appl. No.: 18/348,411

(22) Filed: Jul. 7, 2023

(65) Prior Publication Data

US 2024/0033874 A1 Feb. 1, 2024

(30) Foreign Application Priority Data

Jul. 27, 2022 (JP) ................................ 2022-119276

(51) Int. Cl.
*B23Q 17/09* (2006.01)
*G05B 19/4065* (2006.01)

(52) U.S. Cl.
CPC ..... *B23Q 17/0952* (2013.01); *G05B 19/4065* (2013.01); *G05B 2219/34465* (2013.01)

(58) Field of Classification Search
CPC ............ B23Q 17/0952; B23Q 17/0961; B23Q 17/22; B23Q 17/24; G05B 19/4065; G05B 2219/34465; G05B 2219/37229; G05B 2219/37245; G05B 2219/37252
See application file for complete search history.

(56) References Cited

U.S. PATENT DOCUMENTS

2020/0150156 A1 5/2020 Ono et al.
2021/0223764 A1 7/2021 Nasu
2022/0234164 A1* 7/2022 Torikoshi .............. H01L 21/304

FOREIGN PATENT DOCUMENTS

CA 3018660 A1 * 9/2017 ............. G06N 20/00
CN 108115206 A 6/2018
CN 111185802 A * 5/2020 ........... G01R 19/145
CN 111687688 A * 9/2020 ............. B24B 51/00
(Continued)

OTHER PUBLICATIONS

JP-6813517-B2_translated (Year: 2021).*
(Continued)

*Primary Examiner* — Catherine T. Rastovski
*Assistant Examiner* — Michael J Singletary
(74) *Attorney, Agent, or Firm* — Oblon, McClelland, Maier & Neustadt, L.L.P.

(57) ABSTRACT

The cutting tool inspection apparatus includes a data collection unit, a training data generation unit, and an inspection data generation unit. The data collection unit acquires waveform data of current for one batch supplied to a motor that drives a cutting tool of a machine tool. During generation of training data to be compared with inspection data of the cutting tool, the training data generation unit infers a time range corresponding to a specific process of the machine tool, based on characteristics of the waveform data, and clips waveform data of the time range as the training data. The inspection data generation unit clips, as the inspection data, waveform data at a time position identical to a time position of the time range inferred by the training data generation unit, from the waveform data acquired by the data collection unit during inspection of the cutting tool.

7 Claims, 11 Drawing Sheets

(56) References Cited

FOREIGN PATENT DOCUMENTS

| | | | | | |
|---|---|---|---|---|---|
| JP | 2006116623 | A | * | 5/2006 | |
| JP | 4581622 | | | 9/2010 | |
| JP | 2018-156652 | A | | 10/2018 | |
| JP | 2020149531 | A | * | 9/2020 | ........... G05B 19/401 |
| JP | 6813517 | | | 12/2020 | |
| JP | 6813517 | B2 | * | 1/2021 | |
| JP | 7358755 | B2 | * | 10/2023 | ............. B23Q 17/09 |
| KR | 10-2022-0011144 | A | | 1/2022 | |
| WO | WO-2020026441 | A1 | * | 2/2020 | ............. G06N 20/00 |
| WO | WO-2020213387 | A1 | * | 10/2020 | ............. B23Q 17/09 |

OTHER PUBLICATIONS

JP-2020149531-A_translated (Year: 2020).*
CN-111687688-A_translated (Year: 2020).*
CN-111185802-A_translated (Year: 2020).*
JP-7358755-B2_translated (Year: 2023).*
WO-2020026441-A1_translated (Year: 2022).*
CA-3018660-A1_translated (Year: 2017).*
WO-2020213387-A1_translated (Year: 2020).*
JP-2006116623-A_translated (Year: 2006).*
Korean Office Action issued Dec. 4, 2024 in Korean Patent Application No. 10-2023-0072918 (with English Translation), 8 pages.
Combined Chinese Office Action and Search Report issued Nov. 20, 2025 in Chinese Patent Application No. 202310455227.4 (with English Translation of Office Action), 13 pages.
Office Action issued Jun. 6, 2026, in corresponding Chinese Patent Application No. 202310455227.4 with English translation, 13 pages.

* cited by examiner

CUTTING TOOL INSPECTION APPARATUS AND METHOD

CROSS-REFERENCE TO RELATED APPLICATIONS

The present application is based on and claims priority to Japanese Application No. 2022-119276, filed Jul. 27, 2022, the entire contents of which are incorporated herein by reference.

BACKGROUND

1. Field of the Disclosure

The present disclosure relates to a cutting tool inspection apparatus and method for detecting an anomaly of a cutting tool of a machine tool.

2. Description of the Related Art

Techniques of the related art for detecting an anomaly of a cutting tool of a machine tool include techniques disclosed in Japanese Patent Nos. 4581622 and 6813517. In the techniques disclosed in Japanese Patent Nos. 4581622 and 6813517, a waveform of power or current of a motor that drives a cutting tool is compared with a normal-time waveform to determine whether the cutting tool has an anomaly.

A single machine tool includes many cutting tools, and uses different cutting tools in different cutting processes. Thus, to automatically determine an anomaly of different cutting tools in different processes, comparison with a corresponding normal-time waveform is to be performed in each of the processes.

When the machine tool does not supply a timing signal of, for example, a finishing process to a diagnosis apparatus, the diagnosis apparatus is to infer an interval of the finishing process and extract a waveform of power or current of the finishing process. The techniques of the related art, however, do not implement such a waveform extraction function.

SUMMARY

The present disclosure is made to address the issue described above, and an object thereof is to provide a cutting tool inspection apparatus and method that enables training data and inspection data of a specific process to be extracted even when a machine tool does not supply a timing signal of the specific process.

A cutting tool inspection apparatus according to an aspect of the present disclosure includes a data collection unit configured to acquire waveform data of current supplied to a motor that drives a cutting tool of a machine tool, the waveform data being waveform data for one batch; a training data generation unit configured to, during generation of training data to be compared with inspection data of the cutting tool, infer a time range corresponding to a specific process of the machine tool, based on characteristics of the waveform data, and clip waveform data of the time range as the training data; and an inspection data generation unit configured to clip, as the inspection data, waveform data at a time position identical to a time position of the time range inferred by the training data generation unit, from the waveform data acquired by the data collection unit during inspection of the cutting tool.

In one configuration example of the cutting tool inspection apparatus according to the aspect of the present disclosure, the inspection data generation unit may be configured to divide the training data in units of blocks in a time direction, and align, for each of the blocks, the time position of the training data and the time position of the inspection data with each other.

In one configuration example of the cutting tool inspection apparatus according to the aspect of the present disclosure, the training data generation unit may include a first level determination unit configured to determine a first threshold level for use in clipping waveform data of a range of a finishing process of the machine tool from the waveform data for one batch acquired by the data collection unit during the generation of the training data; a first clipping processing unit configured to clip a range as the waveform data of the range of the finishing process from the waveform data for one batch acquired by the data collection unit during the generation of the training data, the range being a range that is immediately before an end of the one batch and has a value of the current of the first threshold level or smaller; a second level determination unit configured to determine a second threshold level for use in detecting a rise of a waveform in the range of the finishing process; a clipping length determination unit configured to determine, as a clipping length of the training data, a length obtained by adding a predetermined time to a time from a time point at which a value of the current first exceeds the second threshold level in the range of the finishing process to the end of the one batch; and a second clipping processing unit configured to clip data of a range as the training data from the waveform data for one batch acquired by the data collection unit during the generation of the training data, the range being a range that is immediately before the end of the one batch, has a value of the current of the first threshold level or smaller, and has a length of the clipping length, and the inspection data generation unit may include a third clipping processing unit configured to clip data of a range as the inspection data from the waveform data for one batch acquired by the data collection unit during the inspection of the cutting tool, the range being a range that is immediately before an end of the one batch, has a value of the current of the first threshold level or smaller, and has a length of the clipping length.

In one configuration example of the cutting tool inspection apparatus according to the aspect of the present disclosure, the first level determination unit, the first clipping processing unit, the second level determination unit, and the clipping length determination unit may be configured to perform processing for each of pieces of waveform data for one batch obtained through the acquisition performed by the data collection unit a plurality of times and each being the waveform data for one batch; the second clipping processing unit may be configured to use an average first threshold level that is an average of first threshold levels obtained through the processing performed the plurality of times and each being the first threshold level and an average clipping length that is an average of clipping lengths obtained through the processing performed the plurality of times and each being the clipping length, and clip data of a range as the training data from the waveform data for one batch acquired by the data collection unit during the generation of the training data, the range being a range that is immediately before the end of the one batch, has a value of the current of the average first threshold level or smaller, and has a length of the average clipping length; and the third clipping processing unit may be configured to clip data of a range as the inspection data from the waveform data for one batch acquired by the data collection unit during the inspection of the cutting tool, the range being a range that is immediately before the end of the one batch, has a value of the current of the average first threshold level or smaller, and has a length of the average clipping length.

In one configuration example of the cutting tool inspection apparatus according to the aspect of the present disclosure, the training data generation unit may include a first level determination unit configured to determine a first threshold level for use in clipping waveform data of a range of a finishing process of the machine tool from the waveform data for one batch acquired by the data collection unit during the generation of the training data; a first clipping processing unit configured to clip a range as the waveform data of the range of the finishing process from the waveform data for one batch acquired by the data collection unit during the generation of the training data, the range being a range that is immediately before an end of the one batch and has a value of the current of the first threshold level or smaller; a second level determination unit configured to determine a second threshold level for use in detecting a rise of a waveform in the range of the finishing process; a clipping length determination unit configured to determine, as a clipping length of the training data, a length obtained by adding a predetermined time to a time from a time point at which a value of the current first exceeds the second threshold level in the range of the finishing process to the end of the one batch; and a second clipping processing unit configured to clip data of a range as the training data from the waveform data for one batch acquired by the data collection unit during the generation of the training data, the range being a range that is immediately before the end of the one batch, has a value of the current of the first threshold level or smaller, and has a length of the clipping length, and the inspection data generation unit may include the third clipping processing unit configured to clip data of a range as the inspection data from the waveform data for one batch acquired by the data collection unit during the inspection of the cutting tool, the range being a range that is immediately before an end of the one batch, has a value of the current of the first threshold level or smaller, and has a length of the clipping length; a third level determination unit configured to determine, based on the training data, a third threshold level for use in detecting position correction start timings for the inspection data; a block extraction unit configured to set time points at which the value of the current exceeds the third threshold level in the training data as the position correction start timings and set ranges between the position correction start timings in the training data as position correction blocks; a correlation coefficient calculation unit configured to calculate, for each of the position correction blocks, a correction coefficient between the position correction block of the training data and the inspection data of a block interval at a time position identical to a time position of the position correction block; and a correction unit configured to move, for each of the position correction blocks, the time position of the inspection data of the block interval to maximize the correlation coefficient.

In one configuration example of the cutting tool inspection apparatus according to the aspect of the present disclosure, the first level determination unit, the first clipping processing unit, the second level determination unit, and the clipping length determination unit may be configured to perform processing for each of pieces of waveform data for one batch obtained through the acquisition performed by the data collection unit a plurality of times and each being the waveform data for one batch; the second clipping processing unit may be configured to use an average first threshold level that is an average of first threshold levels obtained through the processing performed the plurality of times and each being the first threshold level and an average clipping length that is an average of clipping lengths obtained through the processing performed the plurality of times and each being the clipping length, and clip data of a range as the training data from the waveform data for one batch acquired by the data collection unit during the generation of the training data, the range being a range that is immediately before the end of the one batch, has a value of the current of the average first threshold level or smaller, and has a length of the average clipping length; the third clipping processing unit may be configured to clip data of a range as the inspection data from the waveform data for one batch acquired by the data collection unit during the inspection of the cutting tool, the range being a range that is immediately before the end of the one batch, has a value of the current of the average first threshold level or smaller, and has a length of the average clipping length; the third level determination unit may be configured to determine the third threshold level, based on average data of a plurality of pieces of training data each being the training data; and the block extraction unit may be configured to extract the position correction blocks, based on the average data of the plurality of pieces of training data.

A cutting tool inspection method according to an aspect of the present disclosure includes a first step of acquiring waveform data of current supplied to a motor that drives a cutting tool of a machine tool, the waveform data being waveform data for one batch; a second step of, during generation of training data to be compared with inspection data of the cutting tool, inferring a time range corresponding to a specific process of the machine tool, based on characteristics of the waveform data, and clipping waveform data of the time range as the training data; and a third step of clipping, as the inspection data, waveform data at a time position identical to a time position of the time range inferred in the second step, from the waveform data acquired in the first step during inspection of the cutting tool.

In one configuration example of the cutting tool inspection method according to the aspect of the present disclosure, the third step may include a step of dividing the training data in units of blocks in a time direction, and aligning, for each of the blocks, the time position of the training data and the time position of the inspection data with each other.

According to the aspects of the present disclosure, the training data generation unit and the inspection data generation unit are provided. Thus, even when the machine tool does not supply a timing signal of a specific process such as a finishing process to the cutting tool inspection apparatus, the cutting tool inspection apparatus can infer an interval of the specific process and extract training data and inspection data of the specific process.

In the aspects of the present disclosure, the inspection data generation unit divides the training data in units of blocks in a time direction, and aligns, for each of the blocks, the time position of the training data and the time position of the inspection data with each other. This enables a shift in time to be corrected even when the shift in time occurs in the processing timing of the machine tool in units of control timing periods inside the machine tool.

DETAILED DESCRIPTION

Figure 1:
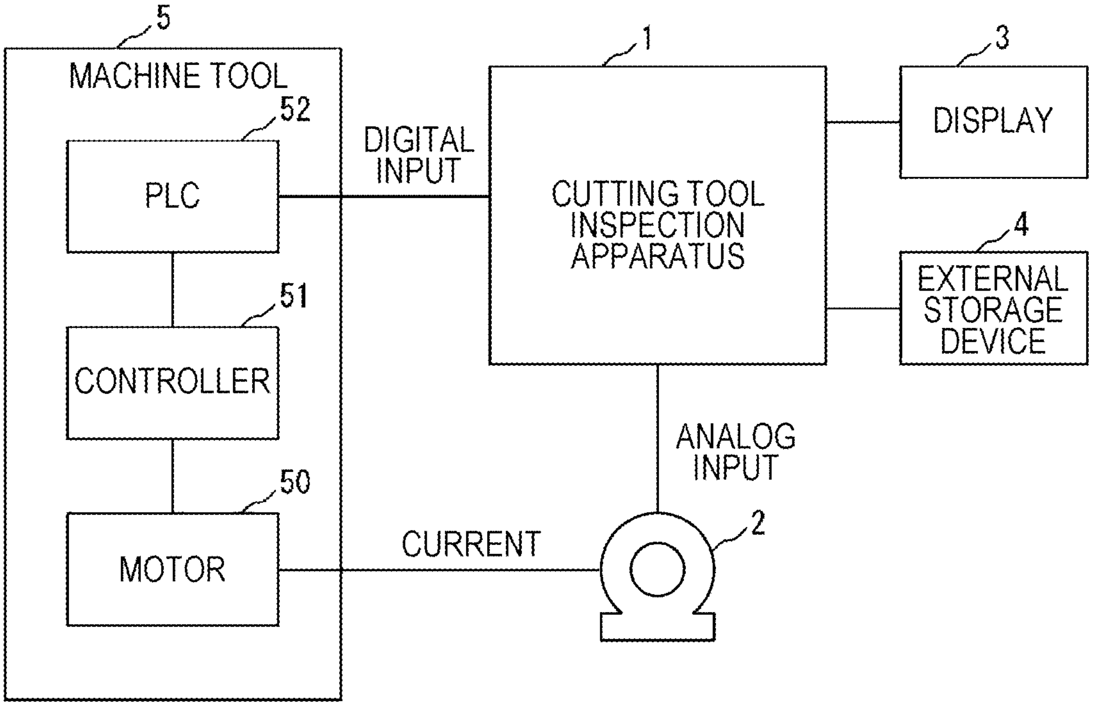
FIG. 1 is a block diagram illustrating a configuration of a cutting tool inspection system according to an embodiment of the present disclosure.

An embodiment of the present disclosure will be described below with reference to the attached drawings. FIG. 1 is a block diagram illustrating a configuration of a cutting tool inspection system according to an embodiment of the present disclosure. The cutting tool inspection system includes a cutting tool inspection apparatus 1, a current transformer (CT) 2, a display 3, and an external storage device 4. The CT 2 converts a current supplied to a motor that drives cutting tools of a machine tool 5 into a current having a magnitude which the cutting tool inspection apparatus 1 can handle. The display 3 displays a result of inspection performed on the cutting tools by the cutting tool inspection apparatus 1. The external storage device 4 stores data obtained by the cutting tool inspection apparatus 1.

The machine tool 5 includes cutting tools (not illustrated) for use in processing a workpiece which is an object to be processed, a motor 50 that drives the cutting tools, a controller 51 that controls the motor 50, and a programmable logic controller (PLC) 52 that controls the entire machine tool 5.

Figure 2:
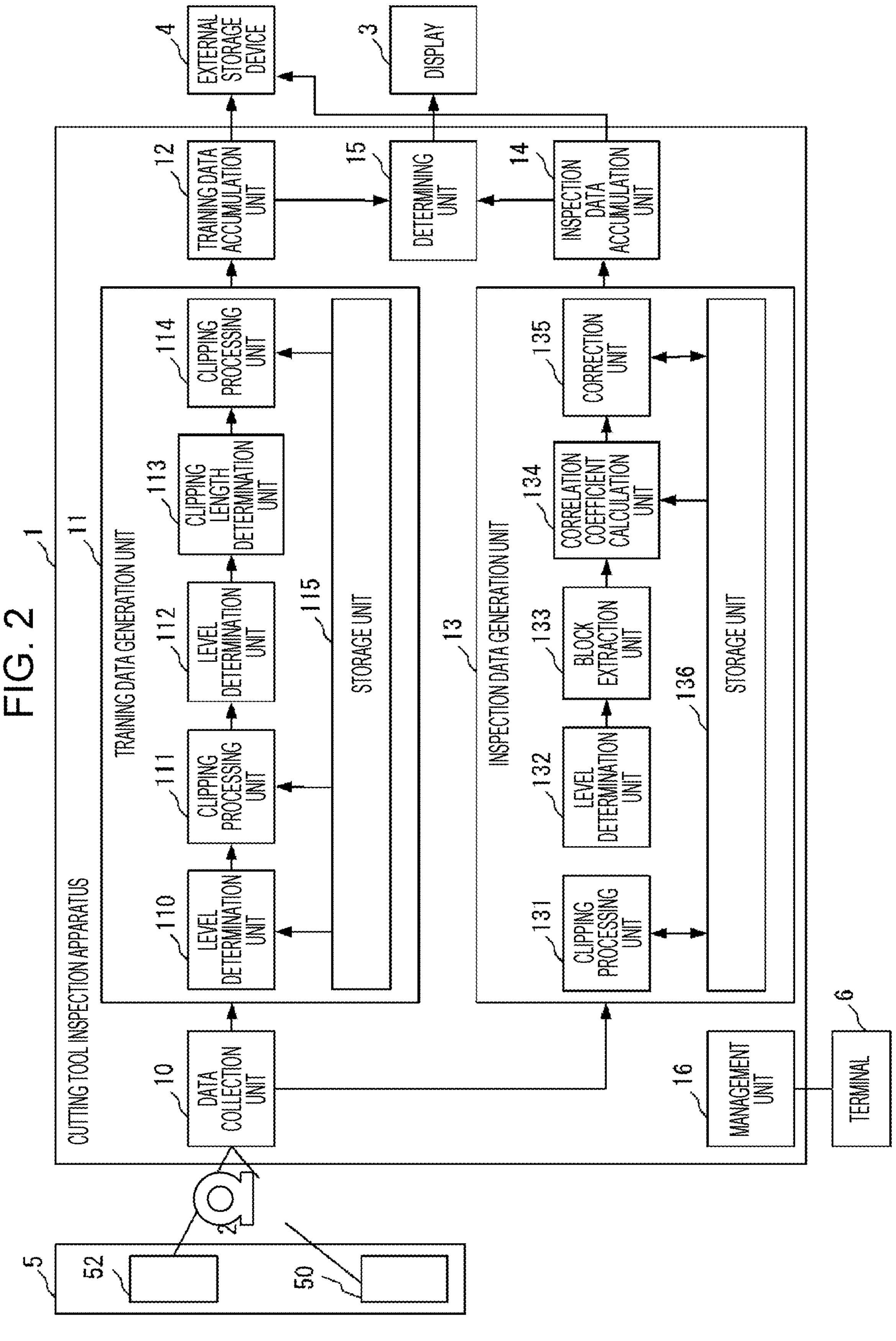
FIG. 2 is a block diagram illustrating a configuration of a cutting tool inspection apparatus according the embodiment of the present disclosure.

FIG. 2 is a block diagram illustrating a configuration of the cutting tool inspection apparatus 1. The cutting tool inspection apparatus 1 includes a data collection unit 10, a training data generation unit 11, a training data accumulation unit 12, an inspection data generation unit 13, an inspection data accumulation unit 14, a determining unit 15, and a management unit 16. The data collection unit 10 acquires, via the CT 2, waveform data of current for one batch supplied to the motor 50. During generation of training data to be compared with inspection data of a cutting tool, the training data generation unit 11 infers, based on characteristics of the waveform data, a time range corresponding to a finishing process of the machine tool 5 and clips, as the training data, waveform data of this time range. The training data accumulation unit 12 accumulates the training data. The inspection data generation unit 13 clips, as the inspection data, waveform data at a time position identical to a time position of the time range inferred by the training data generation unit 11, from waveform data acquired by the data collection unit 10 during inspection of the cutting tool. The inspection data accumulation unit 14 accumulates the inspection data. The determining unit 15 compares the inspection data with the training data and determines whether the cutting tool has an anomaly. The management unit 16 accepts an input from an operator and performs a data collection condition setting or the like.

The training data generation unit 11 includes a level determination unit 110, a clipping processing unit 111, a level determination unit 112, a clipping length determination unit 113, a clipping processing unit 114, and a storage unit 115. The level determination unit 110 determines a first threshold level for use in clipping waveform data of a range of the finishing process of the machine tool 5 from the waveform data for one batch acquired by the data collection unit 10 during the generation of the training data. From the waveform data for one batch acquired by the data collection unit 10 during the generation of the training data, the clipping processing unit 111 clips, as the waveform data of the range of the finishing process, a range that is immediately before an end of the one batch and has a value of the current of the first threshold level or smaller. The level determination unit 112 determines a second threshold level for use in detecting a rise of a waveform in the range of the finishing process. The clipping length determination unit 113 determines, as a clipping length of the training data, a length obtained by adding a predetermined time to a time from a time point at which a value of the current first exceeds the second threshold level in the range of the finishing process to the end of the one batch. From the waveform data for one batch acquired by the data collection unit 10 during the generation of the training data, the clipping processing unit 114 clips, as the training data, data of the range that is immediately before the end of the one batch, has a value of the current of the first threshold value or smaller, and has a length of the clipping length.

The inspection data generation unit 13 includes a clipping processing unit 131, a level determination unit 132, a block extraction unit 133, a correlation coefficient calculation unit 134, a correction unit 135, and a storage unit 136. From the waveform data for one batch acquired by the data collection unit 10 during the inspection of the cutting tool, the clipping processing unit 131 clips, as the inspection data, data of a range that is immediately before an end of the one batch, has a value of the current of the first threshold level or smaller, and has a length of the clipping length. The level determination unit 132 determines, based on the training data, a third threshold level for use in detecting position correction start timings for the inspection data. The block extraction unit 133 sets time points at which the value of the current exceeds the third threshold level in the training data as the position correction start timings and sets ranges between the position correction start timings in the training data as position correction blocks. The correlation coefficient calculation unit 134 calculates, for each of the position correction blocks, a correction coefficient between the position correction block of the training data and the inspection data of a block interval at a time position identical to a time position of the position correction block. The correction unit 135 moves, for each of the position correction blocks, the time position of the inspection data of the block interval to maximize the correlation coefficient.

Figure 3:
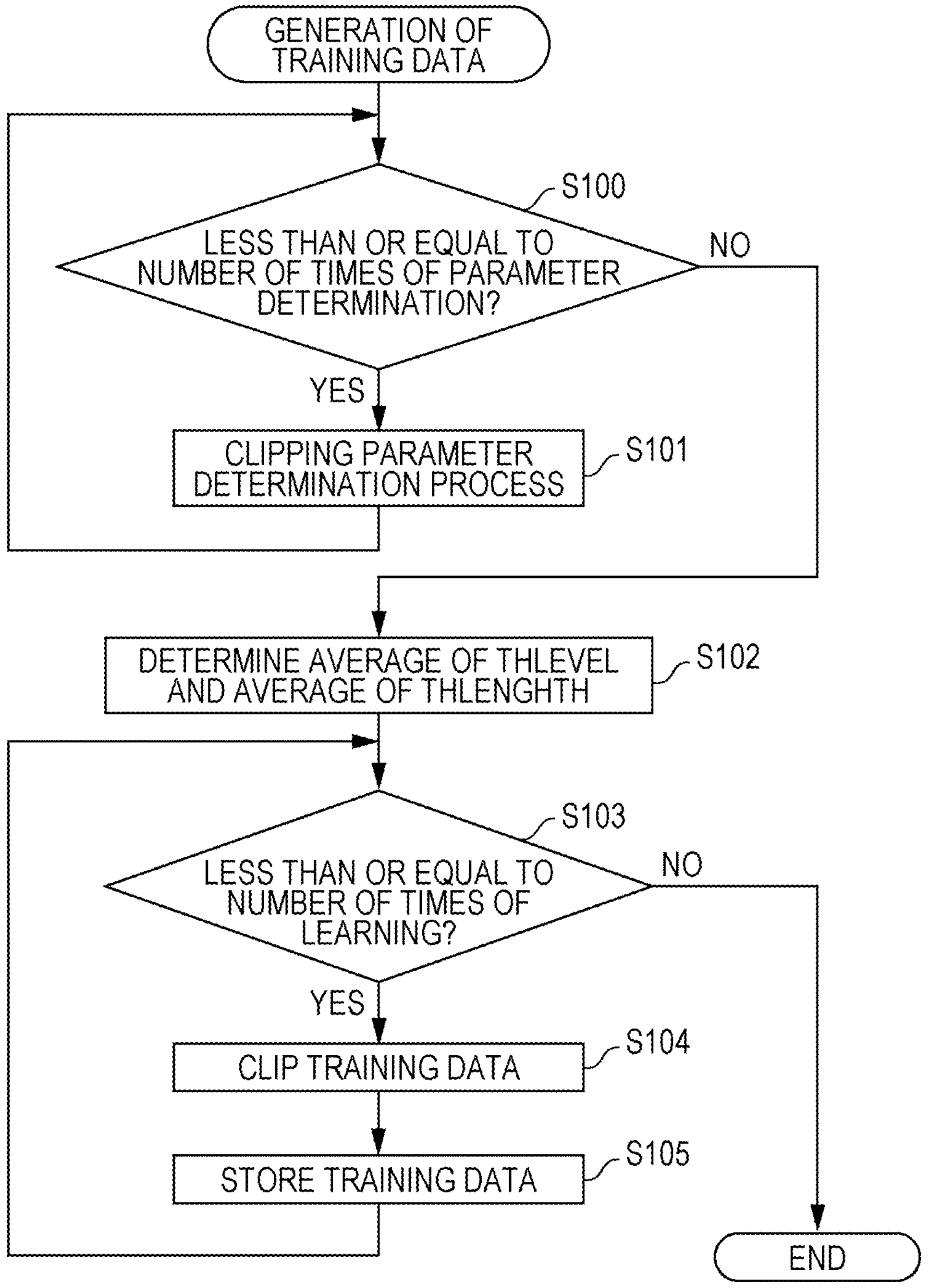
FIG. 3 is a flowchart for describing a training data generation process according to the embodiment of the present disclosure.
Figure 4:
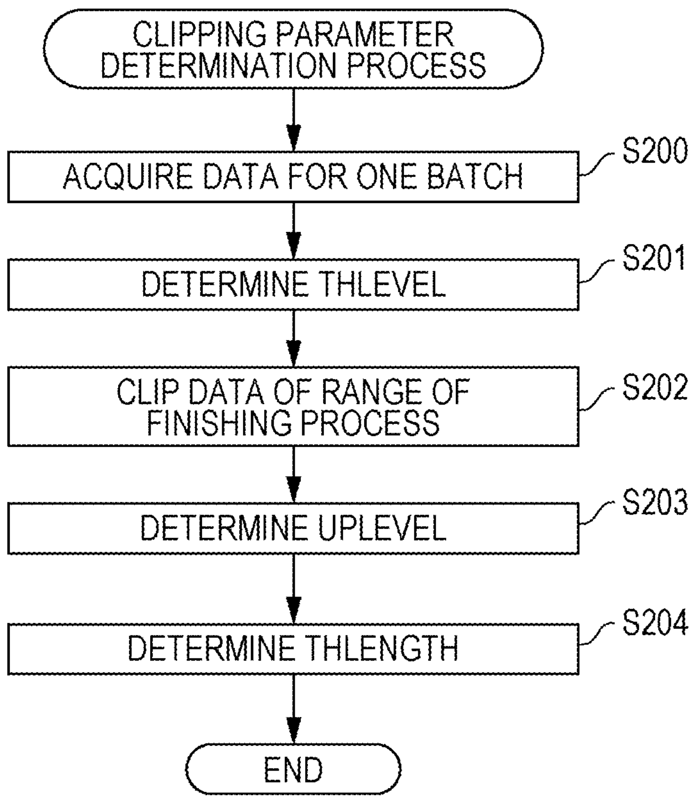
FIG. 4 is a flowchart for describing the training data generation process according to the embodiment of the present disclosure.

A method for generating training data for cutting tool inspection will be described first. FIGS. 3 and 4 are flowcharts for describing a training data generation process.

While a cutting tool of the machine tool 5 is normal, an operator of the cutting tool inspection apparatus 1 operates a terminal 6 to instruct the cutting tool inspection apparatus 1 to generate training data.

In response to receiving the instruction from the operator via the management unit 16, the cutting tool inspection apparatus 1 performs a clipping parameter determination process a predetermined number of times of parameter determination (steps S100 and S101 in FIG. 3). The parameter determination process is a process of determining clipping parameters for use in clipping, as training data, waveform data of current of the finishing process performed on a workpiece from waveform data of current supplied to the motor 50 of the machine tool 5.

Figure 5A:
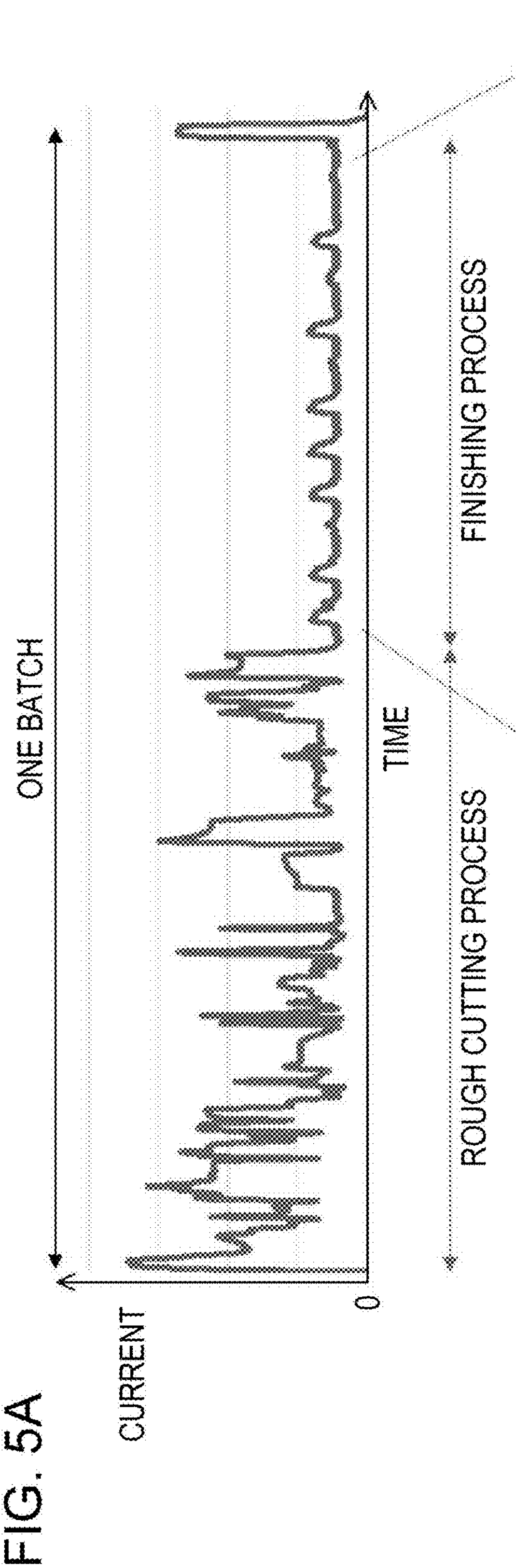
FIGS. 5A and 5B are diagrams illustrating one example of a waveform of current for one batch supplied to a motor.
Figure 5B:
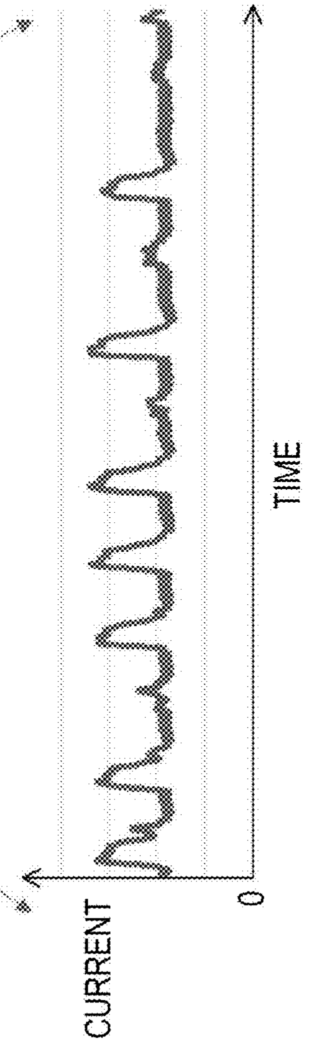

In the clipping parameter determination process, the data collection unit 10 of the cutting tool inspection apparatus 1 acquires, via the CT 2, waveform data of current for one batch from the start of a rough cutting process performed on a workpiece to the end of the finishing process performed on the workpiece (step S200 in FIG. 4). The data acquired by the data collection unit 10 is stored in the storage unit 115 of the training data generation unit 11. Timing signals that roughly indicate one batch are acquirable from the PLC 52. FIG. 5A illustrates one example of a waveform of current for one batch. FIG. 5B illustrates a waveform of a portion clipped as training data or inspection data from the waveform of current illustrated in FIG. 5A.

Then, the training data generation unit 11 of the cutting tool inspection apparatus 1 determines a threshold level (hereinafter, referred to as "THLEVEL") for use in clipping waveform data of current of a range of the finishing process from the waveform data of current for one batch collected by the data collection unit 10 (step S201 in FIG. 4). Specifically, the level determination unit 110 of the training data generation unit 11 sets, as the THLEVEL, a value of the current that is half a peak value of the current in the waveform data of current for one batch. Note that a histogram of current for one batch may be created and a median value may be set as the THLEVEL.

Figure 6:
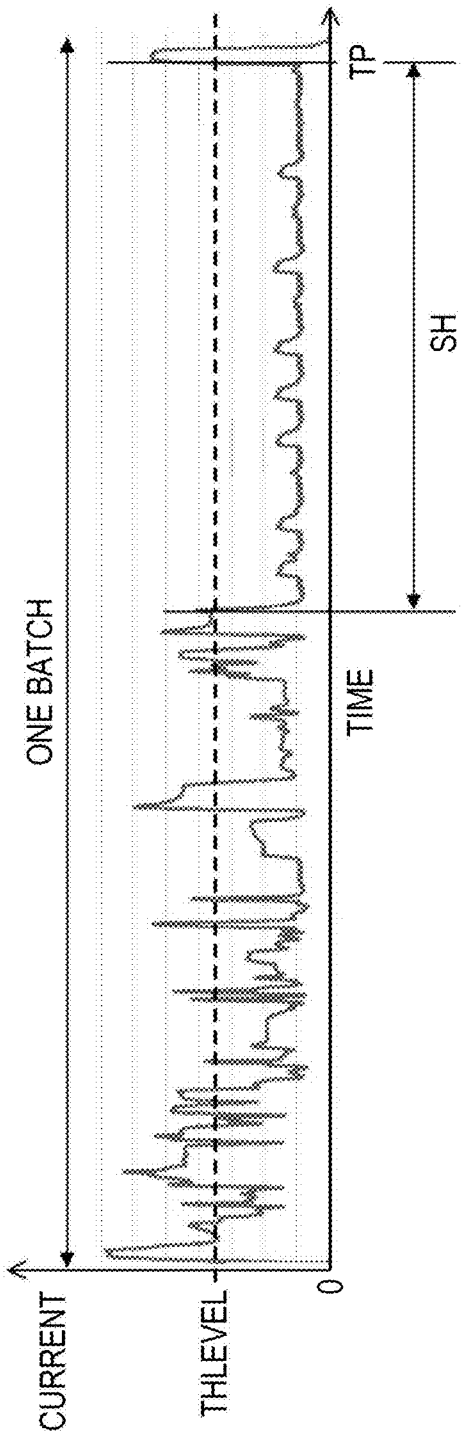
FIG. 6 is a diagram illustrating one example of a waveform of current of a range of a finishing process.

Then, the clipping processing unit 111 of the training data generation unit 11 sets, as a trigger point (TP) (time point of an end of the one batch), a last time point at which the value of the current becomes a value (high) exceeding the THLEVEL from a value (low) of the THLEVEL or smaller in the waveform data of current for one batch acquired by the data collection unit 10, and clips a range that is immediately before the trigger point TP and has the value of the current of the THLEVEL or smaller as the waveform data of current of a range SH of the finishing process (step S202 in FIG. 4). FIG. 6 illustrates the range SH of the finishing process.

The range SH of the finishing process is successfully clipped because data for one batch has characteristics that the waveform of current fluctuates greatly in the first half in work such as rough cutting, has consecutive small peaks in the latter half in the finishing process, rises greatly once at the last part of the one batch because of a counter-electromotive force caused by stopping of the motor, and then the one batch ends as illustrated in FIG. 6.

Subsequently, the level determination unit 112 of the training data generation unit 11 determines a threshold level (hereinafter, referred to as "UPLEVEL") for use in detecting a rise of the waveform of current in the range SH of the finishing process (step S203 in FIG. 4). Specifically, the level determination unit 112 partitions the waveform data of current in the range SH of the finishing process into two clusters by using k-means clustering, for example. The level determination unit 112 sets, as the UPLEVEL, a value of the current at the midpoint of respective centroids of the two clusters.

Figure 7:
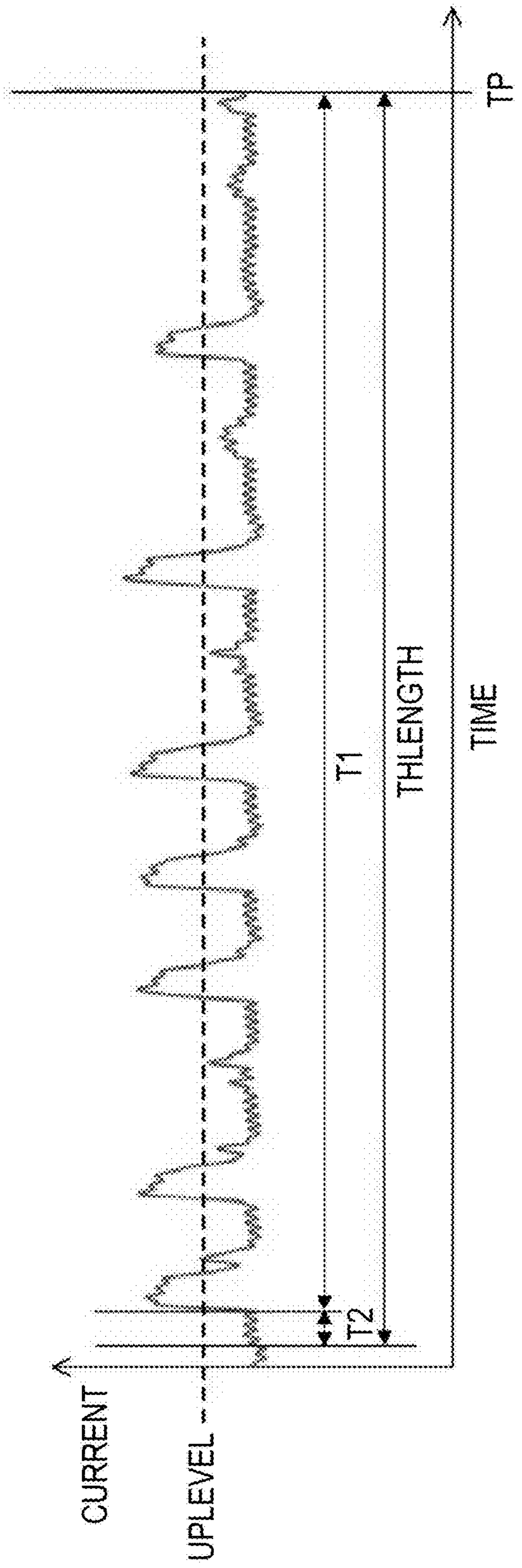
FIG. 7 is a diagram illustrating one example of a waveform of current of a clipping length in the range of the finishing process.

Then, the clipping length determination unit 113 of the training data generation unit 11 determines a length obtained by adding a time T2 of a predetermined header range to a time T1 from a time point at which the value of the current first exceeds the UPLEVEL in the range SH of the finishing process to the trigger point TP described above, as a clipping length (hereinafter, referred to as "THLENGTH") of the training data (step S204 in FIG. 4). In the above manner, the two clipping parameters, i.e., the THLEVEL and the THLENGTH are successfully determined for the waveform data of current for one batch, and the clipping parameter determination process ends. FIG. 7 illustrates one example of a waveform of current having the length THLENGTH in the range SH of the finishing process.

The data collection unit 10 and the training data generation unit 11 perform the clipping parameter determination process in step S101 (S200 to S204) each time waveform data of current for one batch is acquired.

After performing the clipping parameter determination process the predetermined number of times of parameter determination, the clipping processing unit 114 of the training data generation unit 11 sets, as THLEVELa, an average of the plurality of THLEVELs obtained from the pieces of waveform data of current for the predetermined number of times of parameter determination and sets, as THLENGTHa, an average of the plurality of THLENGTHs obtained from the pieces of waveform data of current for the predetermined number of times of parameter determination (step S102 in FIG. 3).

Subsequently, the clipping processing unit 114 performs processing of clipping training data from the waveform data of current for one batch stored in the storage unit 115, a predetermined number of times of learning (steps S103 and S104 in FIG. 3). Specifically, the clipping processing unit 114 clips, as training data, data of a range that is immediately before the trigger point TP, has a value of the current of the THLEVELa or smaller, and has a length of the THLENGTHa from the waveform data of current for one batch stored in the storage unit 115.

The clipping processing unit 114 stores the clipped training data in the training data accumulation unit 12 (step S105 in FIG. 3). Similarly to the above, the trigger point TP (time point of an end of the one batch) is the last time point at which the value of the current becomes a value (high) exceeding the THLEVELa from a value (low) of the THLEVELa or smaller in the waveform data of current for one batch stored in the storage unit 115.

Upon performing clipping and storage of the training data the predetermined number of times of learning (NO in step S103 in FIG. 3), the training data generation process ends.

Note that since the data collection unit 10 acquires waveform data of current for one batch the number of times of parameter determination in the clipping parameter determination process, the number of times of learning may be any number less than or equal to the number of times of parameter determination.

The operator of the cutting tool inspection apparatus 1 then operates the terminal 6 to instruct the cutting tool inspection apparatus 1 to inspect a cutting tool of the machine tool 5.

Figure 8:
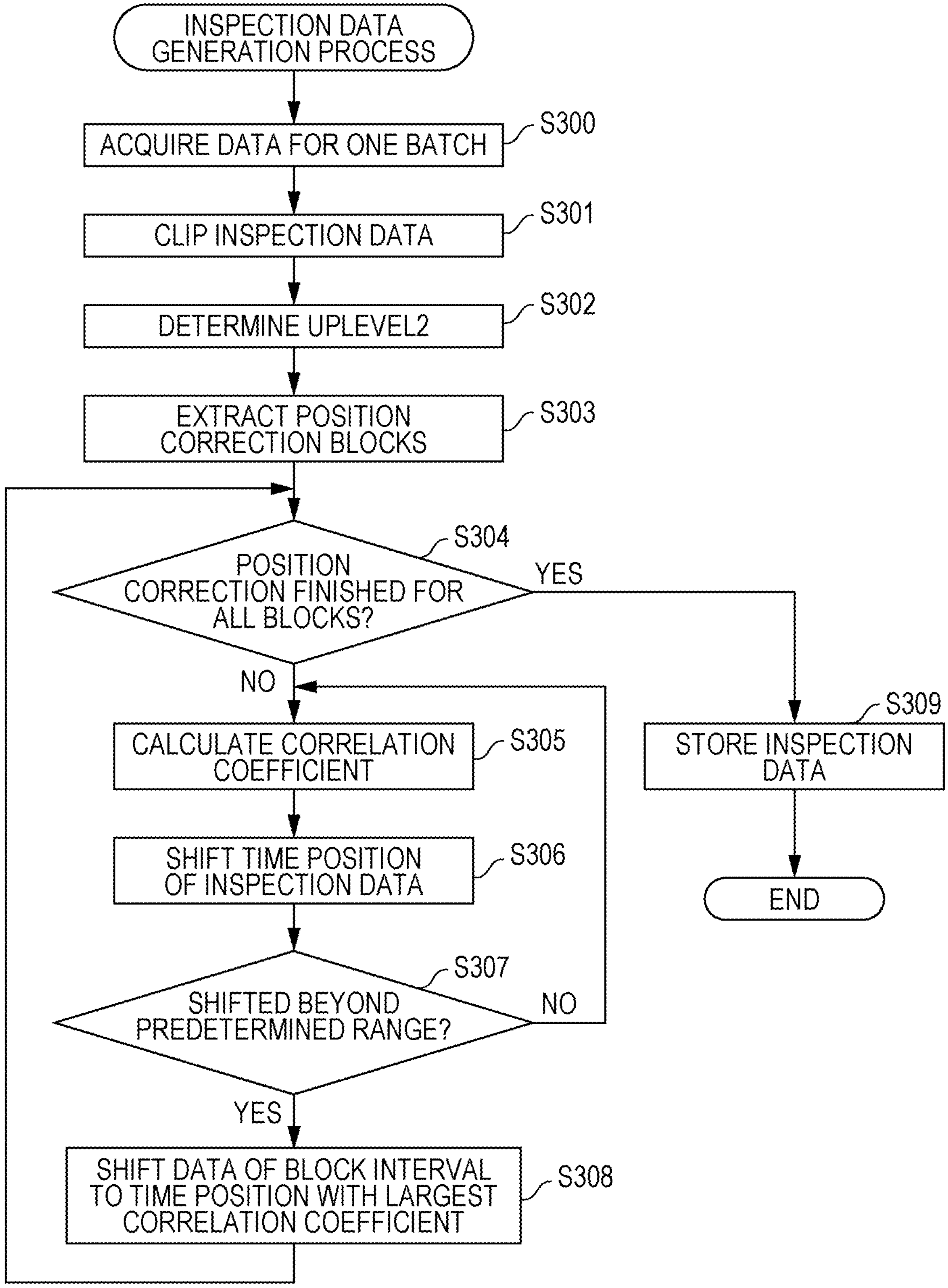
FIG. 8 is a flowchart for describing an inspection data generation process according to the embodiment of the present disclosure.

In response to receiving the instruction from the operator via the management unit 16, the cutting tool inspection apparatus 1 performs an inspection data generation process. FIG. 8 is a flowchart for describing the inspection data generation process.

The data collection unit 10 of the cutting tool inspection apparatus 1 acquires, via the CT 2, waveform data of current for one batch (step S300 in FIG. 8). The data acquired by the data collection unit 10 is stored in the storage unit 136 of the inspection data generation unit 13.

The clipping processing unit 131 of the inspection data generation unit 13 clips, as inspection data, data of a range that is immediately before the trigger point TP, has a value of the current of the THLEVELa or smaller, and has a length of the THLENGTHa from the waveform data of current for one batch stored in the storage unit 136 (step S301 in FIG. 8). The inspection data is stored in the storage unit 136 of the inspection data generation unit 13. Similarly to the above, the trigger point TP (time point of an end of the one batch) is the last time point at which the value of the current becomes a value (high) exceeding the THLEVELa from a value (low) of the THLEVELa or smaller in the waveform data of current for one batch stored in the storage unit 136.

Subsequently, the level determination unit 132 of the inspection data generation unit 13 determines a threshold level (hereinafter, referred to as "UPLEVEL2") for use in detecting position correction start timings for the inspection data, based on average data of the pieces of training data for the number of times of learning stored in the training data accumulation unit 12 (step S302 in FIG. 8). Specifically, the level determination unit 132 partitions the average data of the pieces of training data for the number of times of learning into two clusters by using k-means clustering, for example. The level determination unit 132 sets, as the UPLEVEL2, a value of the current at the midpoint of respective centroids of the two clusters.

Figure 9:
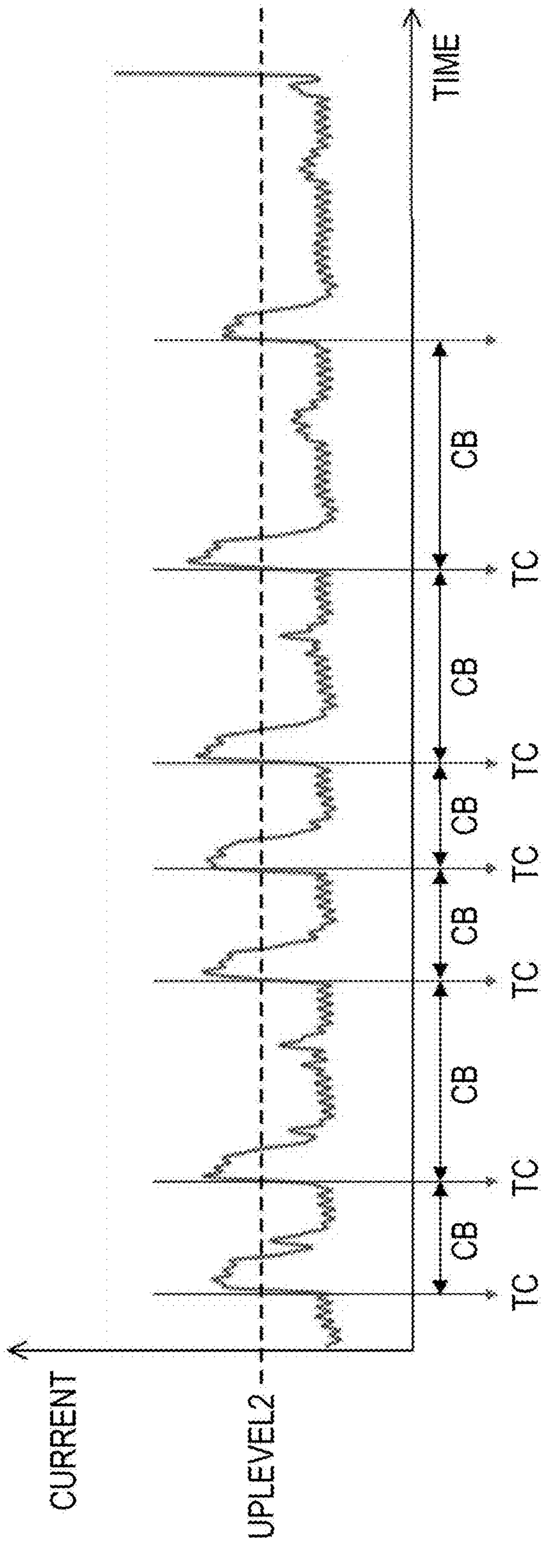
FIG. 9 is a diagram illustrating one example of an average waveform of pieces of training data for the number of times of learning.

Then, the block extraction unit 133 of the inspection data generation unit 13 sets time points at which the value of the current exceeds the UPLEVEL2 in the average data of the pieces of training data for the number of times of learning, as position correction start timings TC for the inspection data and sets a range from one of the position correction start timings TC to a next position correction start timing TC in the average data of the pieces of training data, as a position correction block CB (step S303 in FIG. 8). FIG. 9 illustrates one example of the average waveform of the pieces of training data for the number of times of learning.

The correlation coefficient calculation unit 134 of the inspection data generation unit 13 clips data that is centered on the position correction start timing TC adjacent to the start of the position correction block CB and that has a width of window before and after the position correction start timing TC, from the position correction block CB to be subjected to correlation coefficient calculation, clips data that is centered on the position correction start timing TC and that has a width of window before and after the position correction start timing TC from the inspection data of a block interval at a time position identical to a time position of the position collection block CB, and calculates a correlation coefficient between the data clipped from the position correction block CB and the data clipped from the inspection data (step S305 in FIG. 8). The block interval of the inspection data refers to a range at a time position identical to the time position of the position correction block CB when the start of the average data of the training data is denoted by time 0 and the start of the inspection data is denoted by time 0.

Figure 10A:
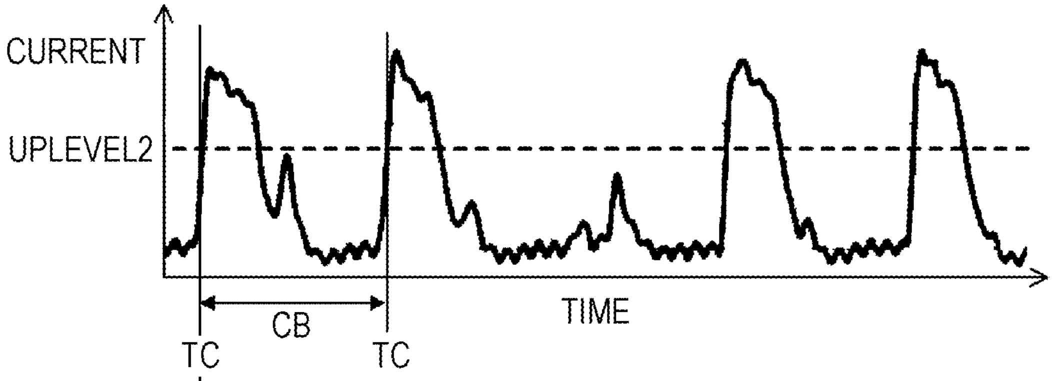
FIGS. 10A, 10B, and 10C are diagrams respectively illustrating a position correction block in the training data, a waveform clipped from the position correction block, and a waveform clipped from the inspection data.
Figure 10B:
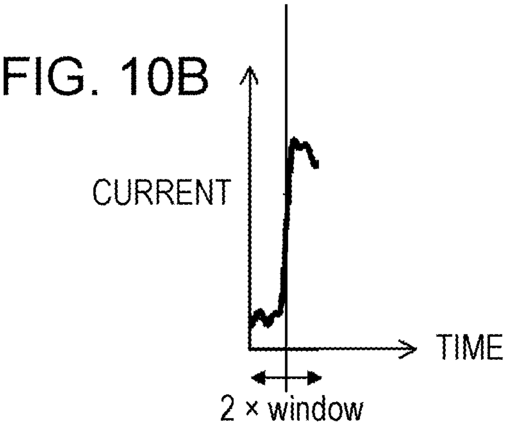
Figure 10C:
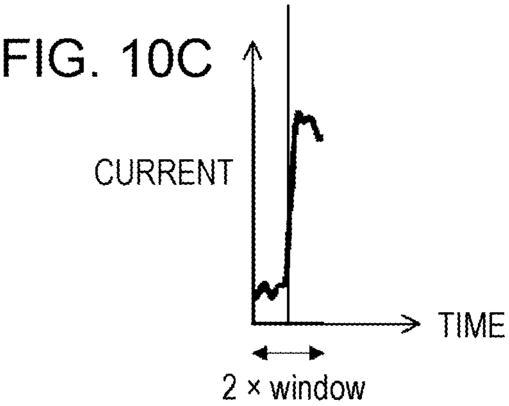

FIG. 10A illustrates the position correction block CB of the training data. FIG. 10B illustrates a waveform clipped from the position correction block DB. FIG. 10C illustrates a waveform clipped from the inspection data of the block interval.

Then, the correlation coefficient calculation unit 134 moves the time position of the inspection data by a predetermined time t (where t<window) (step S306 in FIG. 8). The correlation coefficient calculation unit 134 clips data that is centered on the position correction start timing TC adjacent to the start of the position correction block CB and that has a width of window before and after the position correction start timing TC from the position correction block CB to be subjected to correlation coefficient calculation, clips data that is centered on the position correction start timing TC and that has a width of window before and after the position correction start timing TC from the inspection data of the block interval that is at the time position identical to the time position of the position collection block CB after the movement of the time position, and recalculates a correlation coefficient between the data clipped from the position correction block CB and the data clipped from the inspection data (step S305).

The correlation coefficient calculation unit 134 repeatedly calculates the correlation coefficient while moving the time position of the inspection data within a predetermined time range (for example, from (TC—window) to (TC+window)) centered on the position correction start timing TC adjacent to the start of the position correction block CB to be subjected to correlation coefficient calculation.

After calculating all the correlation coefficients within the predetermined time range (YES in step S307 in FIG. 8), the correction unit 135 of the inspection data generation unit 13 sets the position correction start timing TC adjacent to the start of the position correction block CB as a reference position, and determines an amount by which the time position with the largest correlation coefficient is shifted from the reference position. The correction unit 135 moves, by the amount of shift, the time position of the inspection data of only the block interval subjected to the correlation coefficient calculation of the inspection data stored in the storage unit 136, and updates the inspection data stored in the storage unit 136 (step S308 in FIG. 8).

In this way, the time position of the position correction block CB and the time position of the inspection data of the corresponding block interval can be aligned with each other. Note that in step S306, the time position of the entire inspection data is moved but the inspection data stored in the storage unit 136 is not updated. On the other hand, in step S308, the time position of the inspection data of only the block interval is changed and the inspection data stored in the storage unit 136 is updated.

Since the correction unit 135 moves the time position of the inspection data of only the block interval subjected to correlation coefficient calculation, data at a tail portion of this block interval is deleted by the amount of shift when the time position is moved in a time delaying direction, for example. Since a blank portion without data is created at a head portion of the block interval, the correction unit 135 adds, at the head portion of the block interval, data of the amount of shift that is at a tail portion of the immediately preceding block interval to interpolate the data.

The correction unit 135 deletes data at a head portion of the block interval by the amount of shift when the inspection data of the block interval subjected to correlation coefficient calculation is moved in a time reversing direction. Since a blank portion without data is created at a tail portion of the block interval, the correction unit 135 adds, at the tail portion of the block interval, data of the amount of shift that is at a head portion of the immediately following block interval to interpolate the data.

The inspection data generation unit 13 performs the processing of steps S305 to S308 for each position correction block CB of the average data of the pieces of training data. If the processing is finished for all the position correction blocks CB, the correction unit 135 stores, in the inspection data accumulation unit 14, the pieces of inspection data stored in the storage unit 136 (step S309 in FIG. 8).

The determining unit 15 of the cutting tool inspection apparatus 1 compares the average data of the pieces of training data stored in the training data accumulation unit 12 with the inspection data stored in the inspection data accumulation unit 14 to determine whether the cutting tool of the machine tool 5 has an anomaly. The determination method used at this time is based on a known technique such as that disclosed in Japanese Patent No. 4581622 or 6813517, for example. Note that the present disclosure is not limited to any particular determination method.

The determining unit 15 causes the display 3 to display, for example, the determined result, the waveform of the average data of the pieces of training data, and the waveform of the inspection data. The determining unit 15 stores the determined result, the average data of the pieces of training data, and the inspection data in the external storage device 4.

As described above, in the present embodiment, even when the machine tool 5 does not supply a timing signal of the finishing process to the cutting tool inspection apparatus 1, the cutting tool inspection apparatus 1 can infer an interval of the finishing process and extract training data and inspection data of the finishing process. A shift in time may occur in the processing timing of the machine tool 5 in units of control timing periods inside the machine tool 5. However, the time position of the training data and the time position of the inspection data can be aligned with each other in units of blocks in the present embodiment and thus the shift in time can be corrected.

Figure 11:
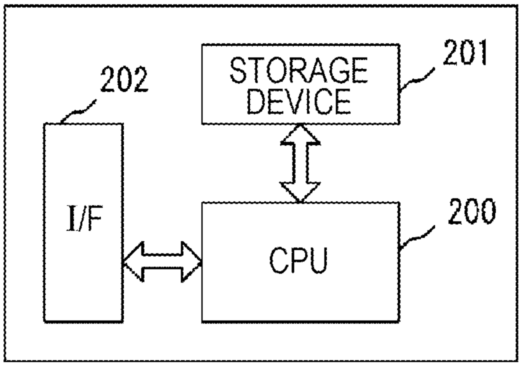
FIG. 11 is a block diagram illustrating a configuration example of a computer that implements the cutting tool inspection apparatus according to the embodiment of the present disclosure.

The cutting tool inspection apparatus 1 described in the present embodiment can be implemented by a computer including a central processing unit (CPU), a storage device, and an interface, and a program that controls these hardware resources. FIG. 11 illustrates a configuration example of this computer.

The computer includes a CPU 200, a storage device 201, and an interface device (I/F) 202. The display 3, the external storage device 4, the machine tool 5, the terminal 6, and so on are connected to the I/F 202. In such a computer, a program for implementing a cutting tool inspection method according to an embodiment of the present disclosure is stored in the storage device 201. The CPU 200 performs the processes described in the present embodiment in accordance with the program stored in the storage device 201. At least part of the cutting tool inspection apparatus 1 may be implemented by hardware.

The embodiment of the present disclosure is applicable to a technique of detecting an anomaly of a cutting tool of a machine tool.

What is claimed is:

1. A cutting tool inspection apparatus, comprising:

a data collection unit configured to acquire waveform data of current supplied to a motor that drives a cutting tool of a machine tool, the waveform data being waveform data for one batch;

a training data generation unit configured to, during generation of training data to be compared with inspection data of the cutting tool, infer a time range corresponding to a specific process of the machine tool, based on characteristics of the waveform data, and clip waveform data of the time range as the training data; and an inspection data generation unit configured to clip, as the inspection data, waveform data at a time position identical to a time position of the time range inferred by the training data generation unit, from the waveform data acquired by the data collection unit during inspection of the cutting tool, wherein the training data generation unit comprises:

a first level determination unit configured to determine a first threshold level for use in clipping waveform data of a range of a finishing process of the machine tool from the waveform data for one batch acquired by the data collection unit during the generation of the training data;

a first clipping processing unit configured to clip a range as the waveform data of the range of the finishing process from the waveform data for one batch acquired by the data collection unit during the generation of the training data, the range being a range that is immediately before an end of the one batch and has a value of the current of the first threshold level or smaller;

a second level determination unit configured to determine a second threshold level for use in detecting a rise of a waveform in the range of the finishing process;

a clipping length determination unit configured to determine, as a clipping length of the training data, a length obtained by adding a predetermined time to a time from a time point at which a value of the current first exceeds the second threshold level in the range of the finishing process to the end of the one batch; and a second clipping processing unit configured to clip data of a range as the training data from the waveform data for one batch acquired by the data collection unit during the generation of the training data, the range being a range that is immediately before the end of the one batch, has a value of the current of the first threshold level or smaller, and has a length of the clipping length, and the inspection data generation unit comprises:

a third clipping processing unit configured to clip data of a range as the inspection data from the waveform data for one batch acquired by the data collection unit during the inspection of the cutting tool, the range being a range that is immediately before an end of the one batch, has a value of the current of the first threshold level or smaller, and has a length of the clipping length.

2. The cutting tool inspection apparatus according to claim 1, wherein the inspection data generation unit is further configured to divide the training data in units of blocks in a time direction, and align, for each of the blocks, the time position of the training data and the time position of the inspection data with each other.

3. The cutting tool inspection apparatus according to claim 1, wherein the first level determination unit, the first clipping processing unit, the second level determination unit, and the clipping length determination unit are configured to perform processing for each of pieces of waveform data for one batch obtained through the acquisition performed by the data collection unit a plurality of times and each being the waveform data for one batch, the second clipping processing unit is configured to:

use an average first threshold level that is an average of first threshold levels obtained through the processing performed the plurality of times and each being the first threshold level and an average clipping length that is an average of clipping lengths obtained through the processing performed the plurality of times and each being the clipping length, and clip data of a range as the training data from the waveform data for one batch acquired by the data collection unit during the generation of the training data, the range being a range that is immediately before the end of the one batch, has a value of the current of the average first threshold level or smaller, and has a length of the average clipping length, and the third clipping processing unit is configured to clip data of a range as the inspection data from the waveform data for one batch acquired by the data collection unit during the inspection of the cutting tool, the range being a range that is immediately before the end of the one batch, has a value of the current of the average first threshold level or smaller, and has a length of the average clipping length.

4. A cutting tool inspection apparatus claim 2, comprising:

a data collection unit configured to acquire waveform data of current supplied to a motor that drives a cutting tool of a machine tool, the waveform data being waveform data for one batch;

a training data generation unit configured to, during generation of training data to be compared with inspection data of the cutting tool, infer a time range corresponding to a specific process of the machine tool, based on characteristics of the waveform data, and clip waveform data of the time range as the training data; and an inspection data generation unit configured to clip, as the inspection data, waveform data at a time position identical to a time position of the time range inferred by the training data generation unit, from the waveform data acquired by the data collection unit during inspection of the cutting tool, wherein the inspection data generation unit is further configured to divide the training data in units of blocks in a time direction, and align, for each of the blocks, the time position of the training data and the time position of the inspection data with each other, the training data generation unit comprises:

a first level determination unit configured to determine a first threshold level for use in clipping waveform data of a range of a finishing process of the machine tool from the waveform data for one batch acquired by the data collection unit during the generation of the training data;

a first clipping processing unit configured to clip a range as the waveform data of the range of the finishing process from the waveform data for one batch acquired by the data collection unit during the generation of the training data, the range being a range that is immediately before an end of the one batch and has a value of the current of the first threshold level or smaller;

a second level determination unit configured to determine a second threshold level for use in detecting a rise of a waveform in the range of the finishing process;

a clipping length determination unit configured to determine, as a clipping length of the training data, a length obtained by adding a predetermined time to a time from a time point at which a value of the current first exceeds the second threshold level in the range of the finishing process to the end of the one batch; and a second clipping processing unit configured to clip data of a range as the training data from the waveform data for one batch acquired by the data collection unit during the generation of the training data, the range being a range that is immediately before the end of the one batch, has a value of the current of the first threshold level or smaller, and has a length of the clipping length, and the inspection data generation unit comprises:

a third clipping processing unit configured to clip data of a range as the inspection data from the waveform data for one batch acquired by the data collection unit during the inspection of the cutting tool, the range being a range that is immediately before an end of the one batch, has a value of the current of the first threshold level or smaller, and has a length of the clipping length;

a third level determination unit configured to determine, based on the training data, a third threshold level for use in detecting position correction start timings for the inspection data;

a block extraction unit configured to set time points at which the value of the current exceeds the third threshold level in the training data as the position correction start timings and set ranges between the position correction start timings in the training data as position correction blocks;

a correlation coefficient calculation unit configured to calculate, for each of the position correction blocks, a correction coefficient between the position correction block of the training data and the inspection data of a block interval at a time position identical to a time position of the position correction block; and a correction unit configured to move, for each of the position correction blocks, the time position of the inspection data of the block interval to maximize the correlation coefficient.

5. The cutting tool inspection apparatus according to claim 4, wherein the first level determination unit, the first clipping processing unit, the second level determination unit, and the clipping length determination unit are configured to perform processing for each of pieces of waveform data for one batch obtained through the acquisition performed by the data collection unit a plurality of times and each being the waveform data for one batch, the second clipping processing unit is configured to use an average first threshold level that is an average of first threshold levels obtained through the processing performed the plurality of times and each being the first threshold level and an average clipping length that is an average of clipping lengths obtained through the processing performed the plurality of times and each being the clipping length, and clip data of a range as the training data from the waveform data for one batch acquired by the data collection unit during the generation of the training data, the range being a range that is immediately before the end of the one batch, has a value of the current of the average first threshold level or smaller, and has a length of the average clipping length, the third clipping processing unit is configured to clip data of a range as the inspection data from the waveform data for one batch acquired by the data collection unit during the inspection of the cutting tool, the range being a range that is immediately before the end of the one batch, has a value of the current of the average first threshold level or smaller, and has a length of the average clipping length, the third level determination unit is configured to determine the third threshold level, based on average data of a plurality of pieces of training data each being the training data, and the block extraction unit is configured to extract the position correction blocks, based on the average data of the plurality of pieces of training data.

6. A cutting tool inspection method, comprising:

a first step of acquiring waveform data of current supplied to a motor that drives a cutting tool of a machine tool, the waveform data being waveform data for one batch;

a second step of, during generation of training data to be compared with inspection data of the cutting tool, inferring a time range corresponding to a specific process of the machine tool, based on characteristics of the waveform data, and clipping waveform data of the time range as the training data; and a third step of clipping, as the inspection data, waveform data at a time position identical to a time position of the time range inferred in the second step, from the waveform data acquired in the first step during inspection of the cutting tool, wherein the second step includes;

determining a first threshold level for use in clipping waveform data of a range of a finishing process of the machine tool from the waveform data for one batch acquired in the first step during the generation of the training data;

clipping a range as the waveform data of the range of the finishing process from the waveform data for one batch acquired in the first step during the generation of the training data, the range being a range that is immediately before an end of the one batch and has a value of the current of the first threshold level or smaller;

determining a second threshold level for use in detecting a rise of a waveform in the range of the finishing process;

determining, as a clipping length of the training data, a length obtained by adding a predetermined time to a time from a time point at which a value of the current first exceeds the second threshold level in the range of the finishing process to the end of the one batch; and clipping data of a range as the training data from the waveform data for one batch acquired in the first step during the generation of the training data, the range being a range that is immediately before the end of the one batch, has a value of the current of the first threshold level or smaller, and has a length of the clipping length, and the third step includes:

clipping data of a range as the inspection data from the waveform data for one batch acquired in the first step during the inspection of the cutting tool, the range being a range that is immediately before an end of the one batch, has a value of the current of the first threshold level or smaller, and has a length of the clipping length.

7. The cutting tool inspection method according to claim 6, wherein the third step comprises:

a step of dividing the training data in units of blocks in a time direction, and aligning, for each of the blocks, the time position of the training data and the time position of the inspection data with each other.

* * * * *